United States Patent [19]

Hehl

[11] Patent Number: 4,886,439
[45] Date of Patent: Dec. 12, 1989

[54] OPENABLE AND CLOSEABLE NOZZLE FOR THE PLASTICIZING CYLINDER OF AN INJECTION MOLDING MACHINE

[76] Inventor: Karl Hehl, Arthur-Hehl-Strasse 32, D-7298 Lossburg 1, Fed. Rep. of Germany

[21] Appl. No.: 289,821

[22] Filed: Dec. 27, 1988

[30] Foreign Application Priority Data

Dec. 30, 1987 [DE] Fed. Rep. of Germany ....... 3744519
Feb. 24, 1988 [EP] European Pat. Off. ... EP88102692.6

[51] Int. Cl.$^4$ ............................................. B29C 45/23
[52] U.S. Cl. .................................. 425/190; 425/562; 425/563; 425/564
[58] Field of Search ............... 425/185, 190, 562, 563, 425/564, 566

[56] References Cited

U.S. PATENT DOCUMENTS 3,915,358 10/1975 Hehl .................................... 425/570
4,708,622 11/1987 Hehl .................................... 425/574

FOREIGN PATENT DOCUMENTS

7020969 12/1972 Fed. Rep. of Germany .
1439001 4/1966 France .

Primary Examiner—Jay H. Woo
Assistant Examiner—Timothy W. Heitbrink
Attorney, Agent, or Firm—Spencer & Frank

[57] ABSTRACT

A plasticizing unit for an injection molding machine includes a carrier block; a plasticizing cylinder securable to the carrier block; an injection nozzle having a nozzle body connected to the front end of the plasticizing cylinder; a discharge outlet at the front end of the nozzle body; a valve needle cooperating withe the discharge outlet and having a closed position shutting off the discharge outlet and an open position allowing discharge of material from the plasticizing cylinder through the discharge outlet; force-transmitting linkage means being connected to the valve needle; and a power unit for displacing said force-transmitting linkage means and the valve needle into the open or power unit for displacing the valve needle into the open or closed position. The nozzle body has a throughgoing, linear, unobstructed nozzle channel extending within the nozzle body from the rear end of the nozzle body to the discharge outlet and being in an axial alignment with the plasticizing cylinder; and a guide channel extending within the nozzle body to the discharge outlet at an acute angle to the nozzle channel. The valve needle is slidably received in the guide channel. At least one of the force-transmitting linkage means is guided respectively connected to the power means by coupling means.

9 Claims, 5 Drawing Sheets

FIG.9

OPENABLE AND CLOSEABLE NOZZLE FOR THE PLASTICIZING CYLINDER OF AN INJECTION MOLDING MACHINE

BACKGROUND OF THE INVENTION

This invention relates to an injection molding machine and is more particularly concerned with an openable and closeable injection nozzle mounted at the discharge end of the plasticizing cylinder which forms part of a plasticizing unit. The nozzle is axially coupled to the plasticizing cylinder and has a discharge opening which may be closed by a valve needle controlled by a power mechanism, such as a hydraulic piston-and-cylinder unit. At least one of force-transmitting linkage means comprises joints at both ends and is connected to the valve needle.

In known injection molding nozzles of the above outlined type, the valve needle is arranged coaxially with the valve body and may be operated by a control cylinder with the intermediary of a two-arm lever. Such an arrangement which is disturbing the thermal symmetry of the nozzle is shown, for example, in French Pat. No. 1,439,001 (FIGS. 7 and 8), in German Utility Model No. 7,020,969 (FIGS. 5–7) and in German published patent. application No. 23 36 099. Such injection molding nozzles are also known from U.S. pat. application Ser. No. 07/168,771 now U.S. Pat. No. 4,808,103, corresponding to West-German patent application No. 37 08 434, which patents are hereby incorporated herein by reference.

It is a disadvantage of the above-outlined prior art arrangement that because of the use of a two-arm lever, the nozzle channel cannot be arranged coaxially with the axis of injection. Rather, the plasticized synthetic material is injected into the discharge zone of the injection nozzle from the plasticizing chamber of the plasticizing cylinder through detour channels, arranged radially offset to the injection axis. Because of the multiple change in the direction of flow of the plasticized material and because of the cross-sectional configuration of the detour channels, a significant pressure drop is usually experienced. When the needle valve of the nozzle is directly actuated by the control cylinder (as shown in FIGS. 5–7 of German Utility Model No. 7,020,969), the needle valve is in direct engagement with the piston of the control cylinder which is situated coaxially to the flow channel. The coaxial arrangement of the control cylinder, however, requires that the plasticizing cylinder be laterally offset relative to the discharge nozzle. Consequently, a throughout linear flow channel extending from the plasticizing chamber of the plasticizing cylinder to the nozzle outlet cannot be constructed regardless of whether the valve needle is actuated by means of a lever or directly by a coaxial control cylinder: the construction of such a nozzle channel is impeded either by the force-transmitting lever or by the control cylinder. Thus, for this reason, in each instance, flow channels are required which have portions oriented transversely to the axis of injection.

Furthermore, closeable injection nozzles are known, whose spring-biased valve needles are arranged at an angle to the injection axis, such as shown in FIG. 3 of French Pat. No. 1,439,001 and in German Utility Model No. 1,796,444. In such closeable nozzles, the nozzle valve opens when the pressure of the synthetic material exceeds a predetermined limit. Consequently, in such nozzles the preconditions for a control by computer program are missing.

SUMMARY OF THE INVENTION

It is an object of the invention to provide an improved injection nozzle of the above-outlined type, including its driving mechanism managed by programm which injection nozzle may be used at low technical expenditure by choice as closeable nozzle or as "open" nozzle with the same characteristical construction of the flow channel caused by hydrodynamic and thermotechnical reasons and to change the injection nozzle together with the plasticizing cylinder automatically without exchanging its driving mechanism from the injection unit. It is noted that by "open" nozzle there is meant a nozzle construction whose nozzle body has a nozzle channel which is coaxial to the axis of injection and is not provided with a nozzle closing mechanism. Such open nozzles operate in conjunction with a decompressing device which relieves the plastic material in the plasticizing cylinder of an excess pressure before the plasticizing unit is moved away from the injection mold assembly. Such a pressure relief prevents an undesired escape of the plastic material. Open nozzles are widely used because of their versatility and because of their reliable, disturbance-free operation.

Injection molding nozzles which are of the closeable type are, however, indispensable in performing certain specific tasks. Thus, such nozzles permit a high injection molding speed at the beginning phase of the injecting operation at the time when the plasticized material in the plasticizing cylinder is, prior to opening the nozzle, at a certain pressure.

The above-outlined object and others to become apparent as the specification progresses, are accomplished by the invention, according to which, briefly stated, the nozzle body has a coaxial nozzle channel which extends up to the nozzle opening and through which the plastic material may flow freely and further, the valve needle which is provided for closing the nozzle channel at the nozzle opening is longitudinally slidably received in a bore which is arranged at an acute angle to the nozzle channel, at least one of the force-transmitting linkage means guided respectively connected to the power means by coupling means, the power means comprise an axis of symmetry, which is arranged at an angle to the valve needle and securing means mounted on the carrier block lock respectively release the plasticizing cylinder to respectively from the carrier block. Although the axis of symmetry of the power cylinder has a relatively high angle to the axis of the valve needle, it is available to transmit a motion of the power means, which motion is parallel to the axis of injection in a closing motion or in an opening motion of the valve needle without bending the valve needle. Further, it is possible to arrange the power cylinder, which can be disconnected, at the carrier block radially displaced from the axis of injection without managing the valve needle in the nozzle body with a force-transmitting lever, which disturbs the thermical symmetry and the flow of the synthetic material through the nozzle. Furthermore, it is not necessary as usually experienced in prior art constructions, to change the drive direction of the power cylinder in an inverted motion of the valve needle by an intermediate member. Such an arrangement of the force-transmission of the power cylinder allows to transmit the upstroke of the power cylinder to the closing motion of the valve needle. Additionally the closeable nozzle may be usable as an "open" nozzle, when the valve needle is situated in a permanently open position.

The shut-off nozzle structured according to the invention is adapted for a particularly rational mass manufacture if the valve needle slides directly in the guide bore provided in the nozzle body; that is, if the diameter of the valve needle corresponds substantially to the inner diameter of the guide bore. Such a direct guidance of the valve needle in the nozzle body has furthermore the advantage that without appreciable weakening of the nozzle body, valve needles of smaller diameter may be used which facilitates the control of the valve needle because significantly smaller forces are needed for maintaining the nozzle closed. This applies particularly to a reliable hydraulic closing of the nozzles in case the plasticized material in the shut-off nozzle has a very high pressure, for example, up to 2800 bar. In case the control cylinder is arranged parallel to the axis of injection, a force reorientation towards the valve needle is feasible without generating stresses in the force-transmitting members or in the valve needle in case the force reorientation is effected by a cardan joint system.

In case a customer—for example, to save cost—requests delivery of a plasticizing assembly only with a permanently open nozzle, the nozzle construction according to the invention makes it possible to couple a nozzle body—which has no guide bore—to the plasticizing cylinder in the same manner as a nozzle body which includes a guide bore. It is to be noted that a particular design of the force-transmitting members according to another feature of the invention causes the valve needle—upon charging the rearward, larger piston face of the hydraulic cylinder—to be moved into its closed position. As a result, and also by virtue of the small diameter (for example, 4 mm) of the valve needle, even if a relatively small control cylinder is used, a reliable closing of the nozzle opening is possible even at very high pressures of the plasticized material. According to another feature of the invention the securing means of the power cylinder can be managed by the same driving cylinder securing the plasticizing cylinder to the carrier block.

DESCRIPTION OF THE PREFERRED EMBODIMENT

Figure 1:
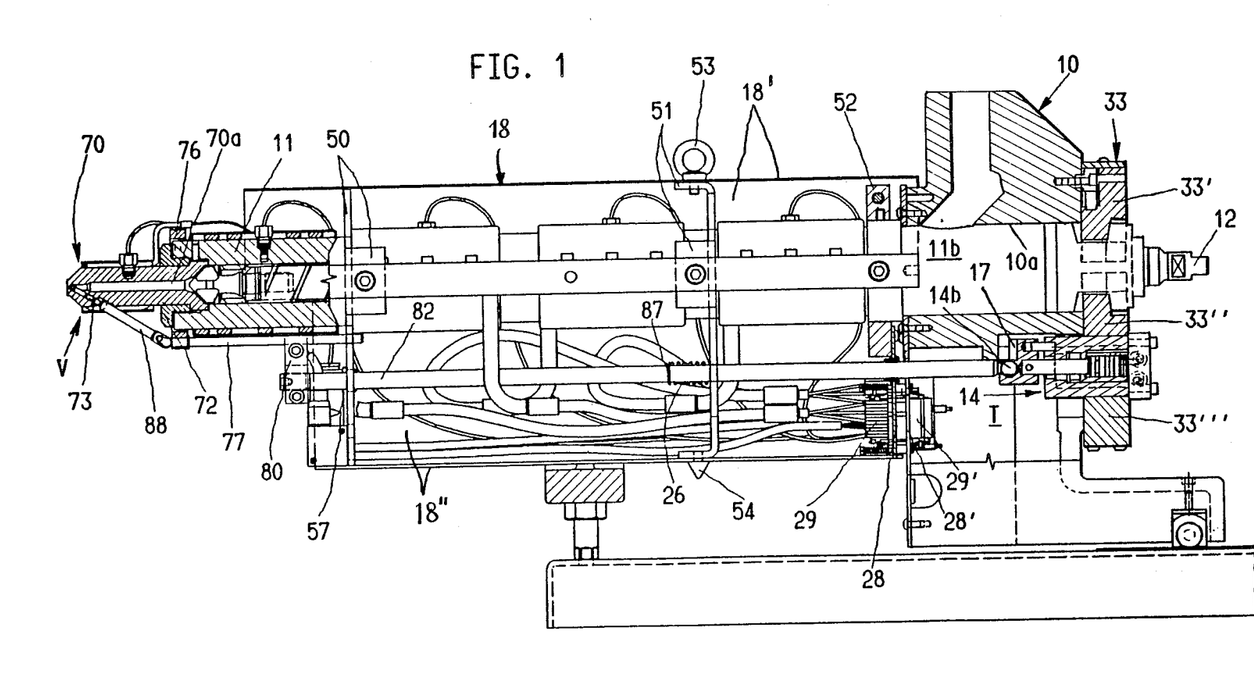
FIG. 1 is a side elevational view, partially in section, of an injection molding assembly incorporating a preferred embodiment of the shutoff nozzle according to the invention, illustrated in a half-open position.
Figure 2:
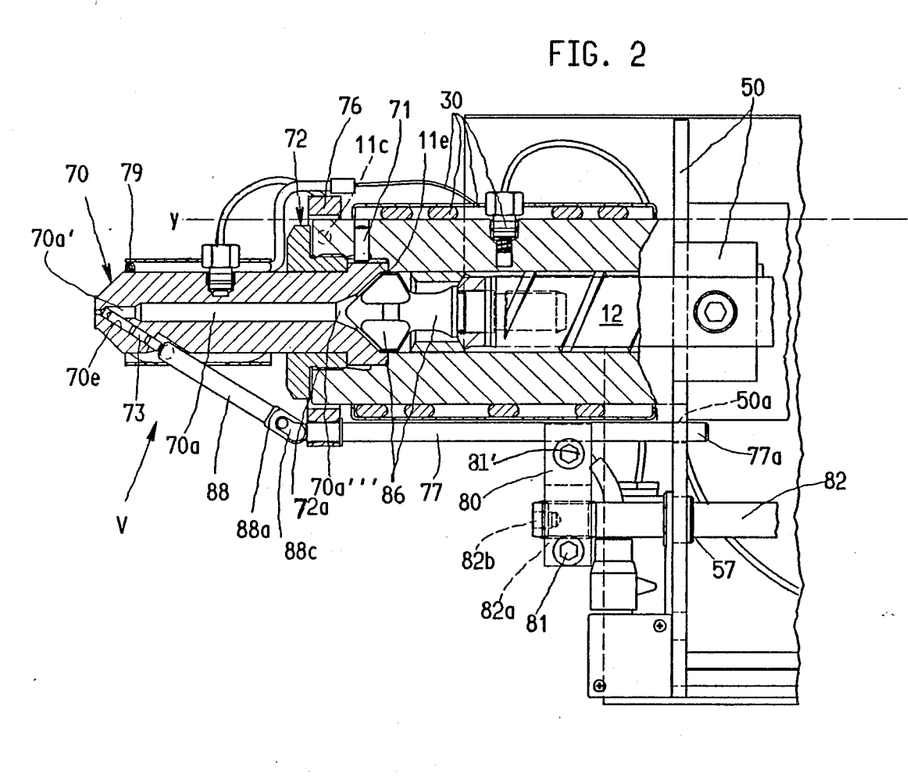
FIG. 2 is a sectional side elevational view of one part of FIG. 1, illustrated on an enlarged scale.

Turning to FIGS. 1 and 2, the plasticizing cylinder 11 which forms part of the plasticizing assembly and which is equipped with a heating device 30 is received, at its rearward portion 11b in a central bore 10a of a carrier block 10. In the carrier block 10, the plasticizing cylinder 11 is immobilized in its working position by a locking device 33. The locking device 33 comprises a radially slidable upper bolt 33' and a radially slidable, two-part lower bolt 33", 33'" which move in a vertical direction on the rearward end of the carrier block 10. The lower bolt 33" 33'" has a bore in which there is received a piston-and-cylinder unit (control piston 14) for controlling a valve needle 73 of a shutoff nozzle V mounted at the front end of the plasticizing cylinder 11. The valve needle 73 may have a diameter of 4 mm. By virtue of this arrangement, the radial locking and unlocking motion of the lower bolt 33", 33'" which carries with it the control cylinder 14, is utilized for coupling and uncoupling the control cylinder to and from the operating linkage of the valve needle 73, as will be described in greater detail later.

The carrier block 10 which is integrated into the injection molding unit is movable, together with the plasticizing cylinder 11, in linear guides into engagement with or away from a firmly clamped injection mold assembly (not shown).

The closing stroke or opening stroke of the control cylinder 14 is transmitted to the valve needle 73 by means of a switch rod 82, an actuating rod 77 and an intermediate member 88. The switch rod 82 and the actuating rod 77 are connected with one another by means of a clamping member 80 as illustrated in particular in FIG. 9. The switch rod 82 has at its end a thread 82a, by means of which it is connected with the clamping member 80. By rotating the switch rod 82 with the aid of a wrench inserted in a hexagonal recess 82b, the switch rod 82 may be axially adjusted relative to the clamping member 80 and thus the sliding path of the valve needle 73 may be adjusted to perform an optimal shut off. The clamping member 80 and the switch rod 82 may be immobilized in their set relative position by means of a clamping screw 81 which bridges a gap 80a, splitting the threaded bore 80b in which the threaded end 82a of the switch rod 82 is received. As it may be observed by comparing FIGS. 2 and 9, the actuating bar 77 passes through the clamping member 80 in the zone of a bore and a slot 80c and may be tightened to the clamping member 80 after appropriate adjustment by means of a screw 81' which bridges the slot 80c. Also referring to FIG. 6, a spherical head 77a situated at the frontal end of the actuating bar 77 is received in a spherical socket 88b of the rod-like force-transmitting intermediate member 88 to thus form a ball joint. The intermediate member 88 surrounds with its frontal end a rearward spherical head 73c of the valve needle 73 to constitute a further ball joint. The spherical socket 88b in the rearward enlarged portion 88a of the intermediate member 88 is laterally open for the introduction or removal of the spherical head 77a of the actuating rod 77. In the spherical socket 88b the spherical head 77a of the actuating rod 77 is secured by means of a lateral locking element 88c. The intermediate member 88 extends approximately in an axial alignment with the valve needle 73.

Figure 3:
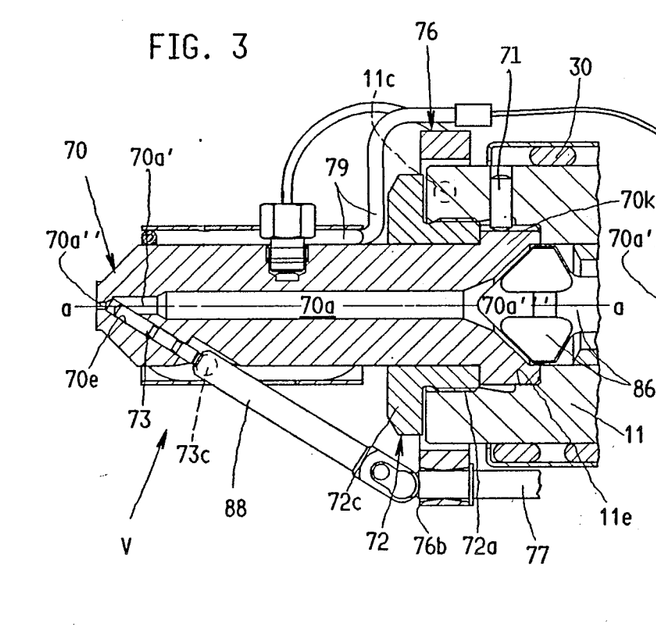
FIG. 3 is a sectional side elevational view of one part of FIG. 2, illustrated on an enlarged scale.
Figure 9:
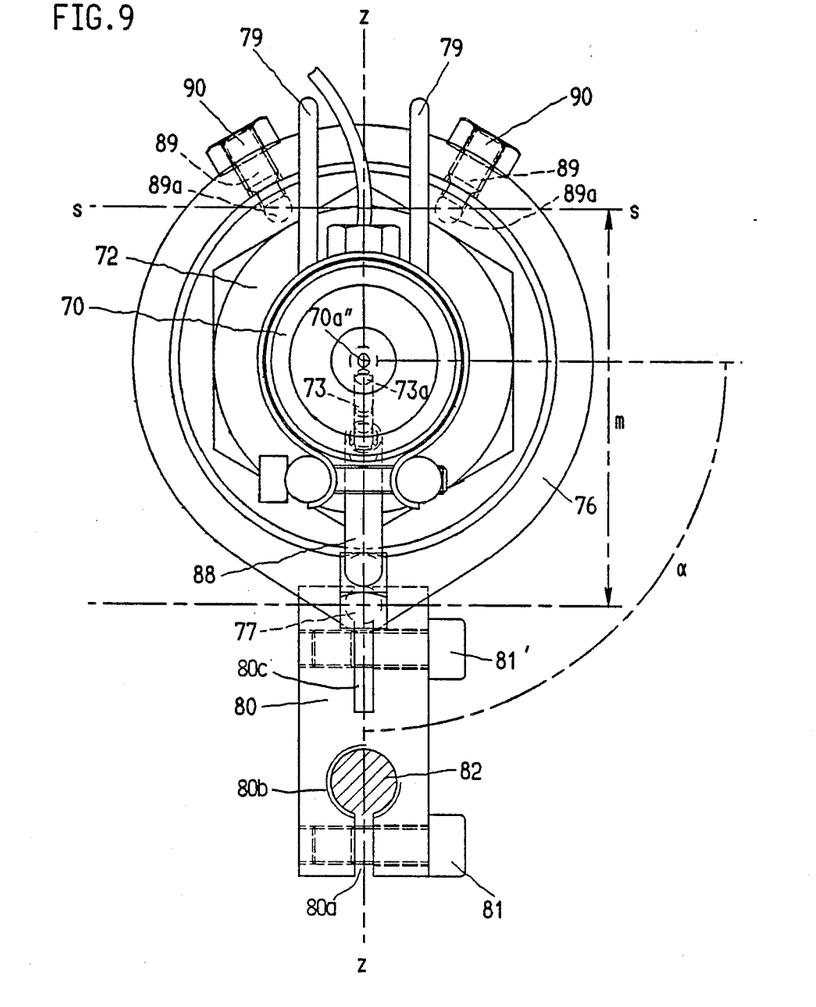
FIG. 9 is an enlarged front elevational view of the preferred embodiment.

The actuating bar 77 is held by means of a pivot ring 76 which surrounds the frontal end of the plasticizing cylinder 11 with a clearance. The pivot ring 76 is articulated to the plasticizing cylinder 11 in the vicinity of the uppermost generatrix y (FIG. 2) on either side thereof for a pivotal motion to make possible the closing and opening of the shutoff nozzle V by means of the valve needle 73. For this purpose, two threaded bolts 89 which are oriented radially to the plasticizing cylinder 11 and which are threadedly connected with the pivot ring 76, extend by means of spherical heads 89a into corresponding spherical pivotal bearings 11c of the plasticizing cylinder 11, as shown in FIG. 3. In this manner, the pivot ring 76 is pivotal between limits about a horizontal pivot axis. The distance m (FIG. 9) of the pivot axis s—s of the pivot ring 76 from the approximately horizontally extending actuating bar 77 corresponds approximately to the outer diameter of the plasticizing cylinder 11. In this manner, the pivot ring 76 forms a relatively long pivotal lever so that upon small closing or opening swinging movements of the pivot ring 76 there is obtained an approximately horizontal motion of the actuating rod 77. The threaded bolts 89 are immobilized in their set working position by means of securing nuts 90. For supporting the actuating bar 77, the latter passes through a bearing bore 76b provided in the pivot ring 76 and situated in the vertical symmetry plane z—z, as shown in FIG. 9. The bearing bore 76b has two frustoconical sections 76b' which merge into one another along an inner circumferential line 76b'' as shown in FIG. 7a.

Figures 5, 6, 7, 7A, 8:
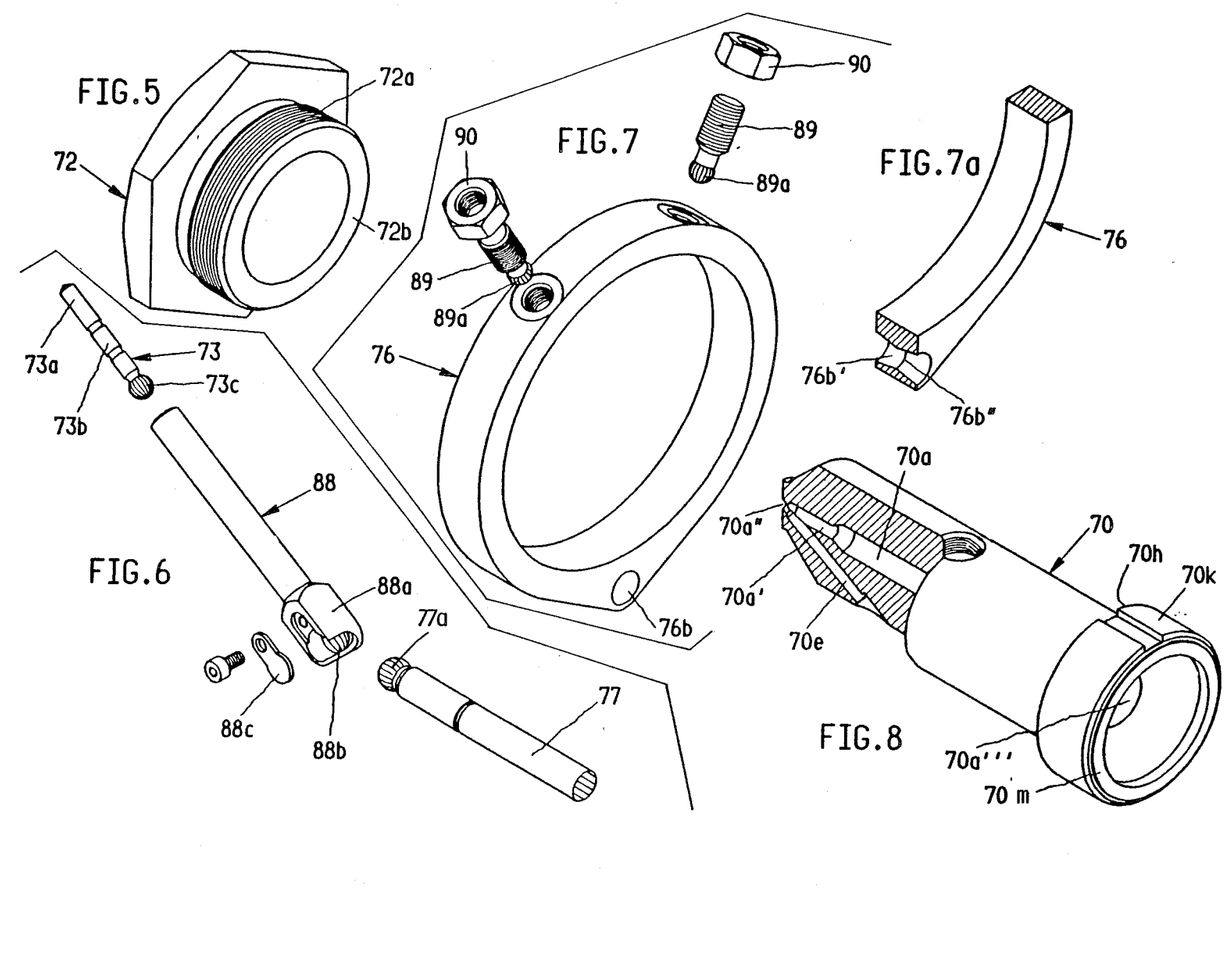
FIGS. 5, 6, 7, 7a and 8 are perspective views, on an enlarged scale, of various components of the preferred embodiment.

Referring in particular to FIG. 8, the nozzle body 70 has a coaxial, linear nozzle channel 70a which extends to the nozzle opening 70a'' and which permits an entirely free flow of the synthetic material therein. The valve needle 73 which is arranged to close or open the nozzle channel 70a at the nozzle opening 70a'' is received in a guide bore 70e which extends at an acute angle to the nozzle channel 70a. The nozzle body 70 is a one-piece component and is provided with a planar engagement face 70m. The diameter of the valve needle 73 corresponds to the inner width of the guide bore 70e which intersects the nozzle channel 70a behind the nozzle opening 70a'' at the frontal end of a narrowed outlet end portion 70a'. During the control motions of the valve needle 73—which has, as shown in FIG. 6, a valving part 73a and a guide part 73b —the outer needle surface glides, with a close sliding fit, directly on the inner surface of the guide bore 70e.

The inner diameter of the coupling bore 11e of the plasticizing cylinder 11 corresponds to the diameter of a coupling thread 72a of a hollow screw 72. The latter is provided with a radial flange 72c. The coupling thread 72a of the hollow screw 72 engages an inner thread of the coupling bore 11e. In this manner, the annular, planar, precision-gound sealing face (engagement face) 70m of the radial flange 70k may be pressed against a corresponding sealing face 11a of the plasticizing cylinder 11, while the hollow screw 72 axially presses against the annular shoulder 70h of the nozzle body 70 with an engagement face 72b. An axial clamping of the radial flange 70k of the nozzle body 70 with the plasticizing cylinder 11 is effected subsequent to a positionally correct adjustment of the nozzle body in such a manner that the valve needle 73 and the force-transmitting elements are oriented symmetrically to the vertical symmetry plane z—z. The nozzle bore 70a has a funnel-like tapering inlet portion 70a''' into which extends the conical terminus of the displacement body 86.

By actuating the control cylinder 14, the valve needle 73 may be placed into its shutoff position or open position. As it may be observed in FIG. 1, a coil spring 26 surrounds the switch bar 82. The coil spring 26 exerts its spring force on the switch bar 82 by virtue of engaging a snap ring 87 seated in a circumferential groove of the switch bar 82 and also engaging an arming element 51 of the plasticizing cylinder 11. By virtue of this arrangement, the spring-biased valve needle 73 is maintained in its shutoff position even if the switch bar 82 is disconnected from the control cylinder 14.

The plasticizing cylinder 11 which may be axially immobilized in the bore 10a of the carrier block 10 by means of the radially and vertically guided locking bolts 33', 33'' and 33''', may be set free by virtue of a rearward motion of the carrier block 10, for example, for the purpose of the feed screw. Such an arrangement is disclosed in U.S. Pat. No. 4,708,622, issued November 24, 1987. The control cylinder 14 is arranged at the carrier block 10 and shifts in unison with the carrier block 10 during the rearward releasing travel thereof.

The assembly for effecting an automatic coupling between the switch bar 82 and the piston rod of the control cylinder 14 comprises, as may be observed in FIG. 1, a coupling portion 14b which is arranged on the switch rod 82 and a coupling portion 17 which is arranged on the piston rod of the control cylinder 14. In the coupled state, the two coupling parts 14b and 17 interengage so that an automatic disconnection of the coupling is achieved by the vertical motion of the locking bolt assembly 33', 33'' and 33''' during the unlocking motion thereof. The coupling assembly is accommodated in a niche T of the carrier block 10. The switch bar 82 is guided approximately parallel to the injection axis a—a in the arming elements 50, 52 of the plasticizing cylinder 11 by means of sliding bushings 57.

The plasticizing cylinder 11 has a two-part cover 18 whose lower part 18'' shrouds the switch rod 82 and whose upper part 18'' has a hoist ring 53. Both cover parts are secured to the arming element 51 of the plasticizing cylinder 11. The head of a lower securing screw 54 has a centering cone. During the transport of the plasticizing unit, the conical securing screw 54 may extend into a corresponding centering opening of the setting faces of the transport devices. After a program-controlled unlocking of the plasticizing cylinder 11 and after its axial immobilization, the plasticizing cylinder 11 may be set free from the carrier block 10 by virtue of the latter being pulled off the plasticizing cylinder 11 by a hydraulic mechanism. Upon such an occurrence, the connecting plugs 29' of a connector plate 28' of the carrier block 10 are separated from the connecting plugs 29 of a connector plate 28 of the plasticizing cylinder 11.

Figure 4:
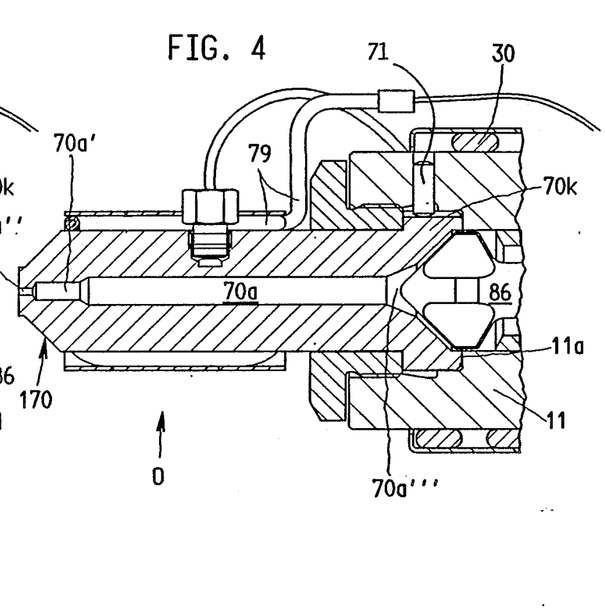
FIG. 4 is a sectional elevational view illustrating an inserted nozzle structured differently from the nozzle construction shown in FIG. 3.

With particular reference to FIG. 4, as noted earlier, the plasticizing cylinder 11 may be, if desired, provided with a nozzle body 170 which has an external configuration identical to the above-described nozzle body 70 but which has no guide bore. As may be observed particularly in FIGS. 3 and 4 in conjunction with FIG. 8, the nozzle bodies 70, 170 are selectively securable in the working position by a pin 71 which extends into the nozzle body 70 and the plasticizing cylinder 11 for preventing relative rotations. As may be observed particularly in FIGS. 3 and 4, the flow channels 70a of the selectively used nozzle body 70 (for a shutoff nozzle V) or 170 (for an open nozzle O) are concentrically arranged to a heating coil 79 so that upon control of the selectively used nozzles V or O, there will be achieved identical initial thermal conditions in the flow passage 70a. As seen in FIG. 2, the rearward terminal portion 77a of the actuating bar 77 passes through an opening 50a of the adjoining arming element 50.

The present disclosure relates to subject matter contained in Federal Republic of Germany patent application No. P 37 44 519.7 (filed December 30th, 1987) and European patent application No. EP 88 10 26 92.6 (filed February 24th, 1988) which are incorporated herein by reference.

It will be understood that the above description of the present invention is susceptible to various modifications, changes and adaptations, and the same are intended to be comprehended within the meaning and range of equivalents of the appended claims.

What is claimed is:

1. In a plasticizing unit for an injection molding machine; said plasticizing unit including
    a carrier block;
    a plasticizing cylinder through which plasticized material is driven; said plasticizing cylinder having a front end and a rear end;
    securing means for attaching said plasticizing cylinder, at said rear end thereof to said carrier block;
    an injection nozzle having a nozzle body including a front end and a rear end; said rear end of said nozzle body being connected to said front end of said plasticizing cylinder; said nozzle body having a discharge outlet at the front end of said nozzle body;
    a valve needle cooperating with said discharge outlet and having a closed position shutting off the discharge outlet and an open position allowing discharge of material from said plasticizing cylinder through said discharge outlet;
    at least one force-transmitting linkage means comprising joints at opposite ends and being connected to said valve needle; and
    power means for displacing said at least one force-transmitting linkage means and said valve needle into a selected one of said open and closed positions;
    the improvement wherein said nozzle body has
    (a) a throughgoing, linear, unobstructed nozzle channel extending within the nozzle body from the rear end of said nozzle body to said discharge outlet and being in an axial alignment with said plasticizing cylinder;
    (b) a guide channel extending within said nozzle body to said discharge outlet at an acute angle to said nozzle channel; said valve needle being slidably received in said guide channel;
    (c) said at least one force-transmitting linkage means being guided and being connected to said power means;
    (d) coupling means for connecting said at least one force-transmitting linkage means to said power means and for disconnecting said at least one force-transmitting linkage means from said power means;
    (e) said power means mounted on said carrier block, comprising an axis of symmetry; said axis of symmetry of said power means being arranged at an angle to said valve needle; and
    (f) said securing means mounted on said carrier block having a locking position for locking said plasticizing cylinder to said carrier block and a releasing position for allowing separation of said plasticizing cylinder from said carrier block.

2. A plasticizing unit as defined in claim 1, wherein said nozzle body is a one-piece component; further wherein said rear end of said nozzle body has a planar terminal engagement face, and said valve needle has a diameter substantially corresponding to that of said guide channel, whereby said valve needle is received in said guide channel with a close sliding fit; further wherein said nozzle channel has a narrowed terminal portion ending at said discharge outlet; said guide channel merging into said narrowed terminal portion immediately adjacent said discharge opening.

3. A plasticizing unit as defined in claim 1, wherein said power means comprises a hydraulic cylinder unit including a power cylinder having a cylinder axis oriented parallel to said nozzle channel and a piston slidably received in said power cylinder; said at least one force-transmitting linkage means jointedly connecting said valve needle to said piston; said at least one force-transmitting linkage means including a bar-shaped intermediate member being substantially in axial alignment with said valve needle.

4. A plasticizing unit as defined in claim 3, in which said plasticizing cylinder is generally horizontally oriented and having an uppermost generatrix; said at least one force-transmitting linkage means further comprising an actuating bar coupled to said intermediate member and a switch bar coupled to said piston and rigidly connected with said actuating bar; a pivot ring surrounding said plasticizing cylinder with an annular clearance at a front end thereof and pivotal connecting means for pivotally securing said pivot ring to said plasticizing cylinder at both sides of said pivot ring and in the vicinity of said uppermost generatrix; said actuating bar being connected to said pivot ring and causing a pivotal displacement thereof upon motion of said actuating bar.

5. A plasticizing unit as defined in claim 4, wherein said actuating bar is horizontally oriented; further wherein said pivotal connecting means comprises two bolts oriented radially to said plasticizing cylinder and passing through and threadedly engaging said pivot ring; each said bolt being provided with a spherical head; said pivotal connecting means further comprising bearing sockets provided in said plasticizing cylinder and receiving a respective said spherical head; said pivotal connecting means defining a horizontal pivot axis having a distance from said actuating bar; said distance approximately equals an outer diameter of said plasticizing cylinder.

6. A plasticizing unit as defined in claim 4, wherein said pivot ring has a bearing bore arranged symmetrically to an imaginary vertical axial plane of said plasticizing cylinder; said bearing bore being formed of two inwardly tapering, contiguous bore portions; said actuating bar passing through said bearing bore.

7. A plasticizing unit as defined in claim 1, wherein said front end of said plasticizing cylinder has a radially symmetrical receiving bore; said rear end of said nozzle body having a radial flange accommodated in said receiving bore; a coupling nut threadedly received in said receiving bore and arranged to axially tighten said radial flange of said nozzle body against said plasticizing cylinder.

8. A plasticizing unit as defined in claim 1, wherein said securing means comprises radially displaceable locking bolts mounted on said carrier block and cooperating with the rear end of said plasticizing cylinder; said locking bolts having a locking position for locking said plasticizing cylinder to said carrier block and a releasing position for allowing axial separation of said plasticizing cylinder from said carrier block; said carrier block being arranged for axial displacement; said power means being carried by said carrier block; said power means and said carrier block being movable as a unit upon axial displacements of said carrier block.

9. A plasticizing unit as defined in claim 8, wherein said power means is fixedly mounted on one of said locking bolts to move with said one locking bolt as a unit during radial displacements thereof; additional force-transmitting linkage means for operatively connecting said power means to said valve needle; and said coupling means for connecting said additional force-transmitting linkage means to said power means upon radial motion of said one locking bolt into the locking position and for disconnecting said additional force-transmitting linkage means from said power means upon radial motion of said one locking bolt into the released position.

* * * * *